US009236895B1

(12) United States Patent
Rausch

(10) Patent No.: US 9,236,895 B1
(45) Date of Patent: Jan. 12, 2016

(54) PHASE FILTER FOR RADIO FREQUENCY (RF) SIGNALS

(71) Applicant: Clearwire IP Holdings LLC, Overland Park, KS (US)

(72) Inventor: Walter F. Rausch, Shawnee, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 61 days.

(21) Appl. No.: 14/274,039

(22) Filed: May 9, 2014

(51) Int. Cl.

| | |
|---|---|
| ***H01P 1/20*** | (2006.01) |
| ***H04B 1/10*** | (2006.01) |
| *H01P 1/213* | (2006.01) |
| *H01P 1/202* | (2006.01) |
| *H01P 1/203* | (2006.01) |

(52) U.S. Cl.
CPC .. *H04B 1/10* (2013.01); *H01P 1/20* (2013.01); *H01P 1/202* (2013.01); *H01P 1/203* (2013.01); *H01P 1/2135* (2013.01)

(58) Field of Classification Search
CPC ........... H01P 1/20; H01P 1/202; H01P 1/203; H01P 1/212; H01P 1/213; H01P 1/2133; H01P 1/2135
USPC .................. 333/202, 204, 206, 208, 211, 212
See application file for complete search history.

(56) References Cited

U.S. PATENT DOCUMENTS

| | | | | |
|---|---|---|---|---|
| 2,856,588 | A * | 10/1958 | Burns, Jr. | 333/198 |
| 5,184,096 | A * | 2/1993 | Wakino et al. | 333/175 |
| 6,518,854 | B2 * | 2/2003 | Kayano et al. | 333/99 S |
| 2004/0041635 | A1 * | 3/2004 | Sano et al. | 330/306 |
| 2007/0001787 | A1 * | 1/2007 | Kayano | 333/204 |
| 2009/0160430 | A1 * | 6/2009 | Brown et al. | 324/76.23 |
| 2009/0295502 | A1 * | 12/2009 | Ninan et al. | 333/174 |
| 2012/0140860 | A1 | 6/2012 | Rimini et al. | |

FOREIGN PATENT DOCUMENTS

| | | |
|---|---|---|
| EP | 1408619 | 4/2004 |

* cited by examiner

*Primary Examiner* — Duc M Nguyen

(57) ABSTRACT

In a Radio Frequency (RF) filter, a first conductive link has a first length corresponding to a first (N) number of wavelengths of a primary RF frequency. A second conductive link has a second length corresponding to both a second (M) number of wavelengths of the primary RF frequency and an out-out-phase (X) number of wavelengths of a secondary RF frequency. An input interface receives an input RF signal and transfers a first component of the input signal over the first link and transfers a second component of the input RF signal over the second link. An output interface combines the first component from the first link with the second component from the second link to transfer an output RF signal. The energy at the primary frequency constructively combines in-phase, but the energy at the secondary frequency destructively combines out-of-phase.

20 Claims, 8 Drawing Sheets

PHASE FILTER FOR RADIO FREQUENCY (RF) SIGNALS

TECHNICAL BACKGROUND

Wireless communication networks are deployed across large geographic areas in an overlapping manner. At a given geographic location, several different wireless service providers may provide wireless communication service to various customers. The service providers separate themselves from one another by using different radio frequencies for their wireless communications. Thus, multiple wireless service providers use different radio frequencies to maintain separation among their users and networks.

In addition to wireless communication networks, other systems also propagate wireless signals at various frequencies. For example, police and fire personnel utilize certain radio frequencies for their own communications. In another example, weather radar systems propagate wireless signals for Doppler scanning purposes. Thus, a given geographic location may have overlapping radio coverage for wireless service providers, first responders, weather radars, and the like.

The complex collection of radio frequencies at a given location needs to be managed to avoid radio interference. Energy for a radio signal at a first frequency may be shifted to a second frequency by the environment or a system flaw. When conditions cause energy to shift from one frequency to another in our multi-frequency environment, then radio interference results, and the quality of everyone's wireless experience is harmed.

To avoid radio interference between frequencies, wireless systems use electronic filters to control the energy propagation on a per-frequency basis. Unfortunately, the electronic filters may be too expensive or not sufficiently durable for some field applications. Current filter technologies are not efficient and effective enough for today's multi-frequency environment.

TECHNICAL OVERVIEW

In a Radio Frequency (RF) filter, a first conductive link has a first length corresponding to a first (N) number of wavelengths of a primary RF frequency. A second conductive link has a second length corresponding to both a second (M) number of wavelengths of the primary RF frequency and an out-out-phase (X) number of wavelengths of a secondary RF frequency. An input interface receives an input RF signal and transfers a first component of the input signal over the first link and transfers a second component of the input RF signal over the second link. An output interface combines the first component from the first link with the second component from the second link to transfer an output RF signal. The energy at the primary frequency constructively combines in-phase, but the energy at the secondary frequency destructively combines out-of-phase.

DETAILED DESCRIPTION

Figure 1:
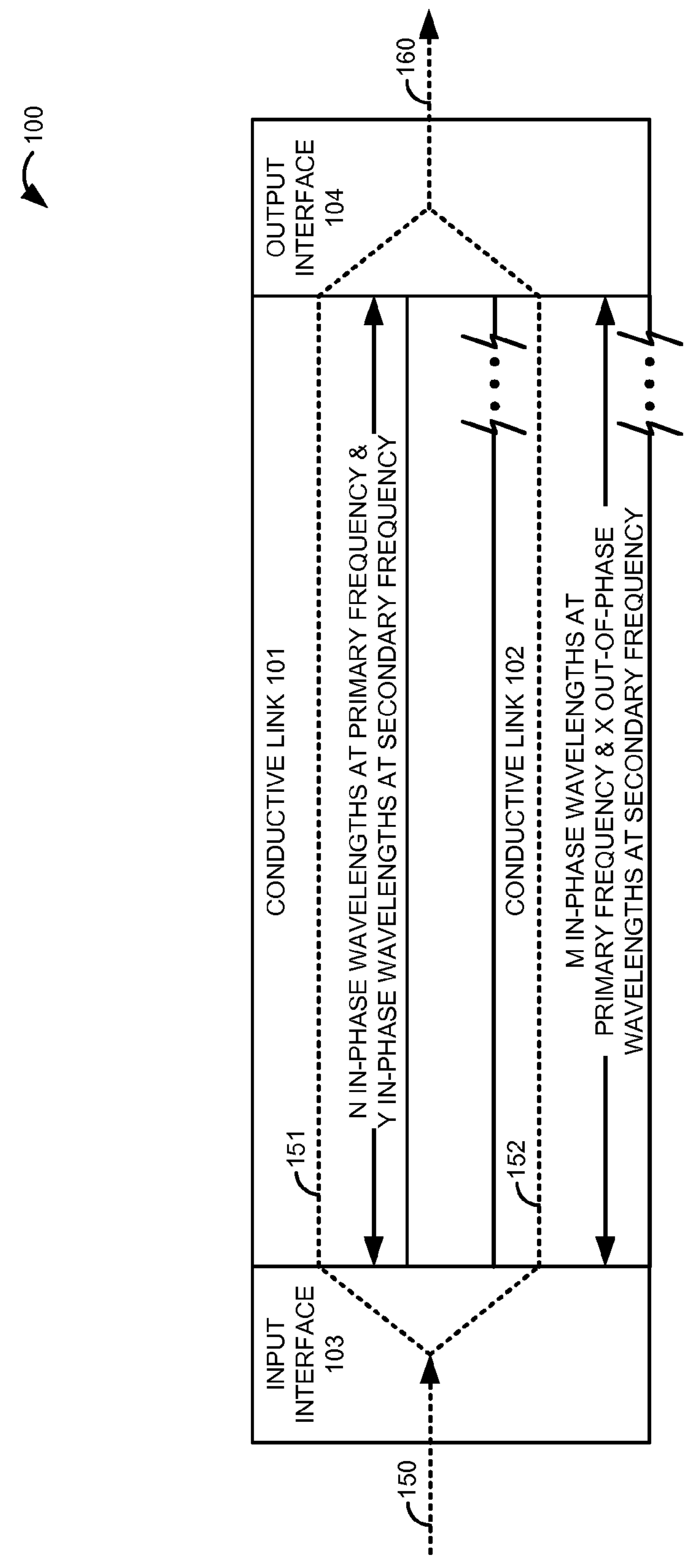
FIG. 1 illustrates an RF filter to remove secondary energy from a primary RF signal.

FIG. 1 illustrates Radio Frequency (RF) filter 100 to remove unwanted RF energy from RF signal 150. RF filter 100 comprises conductive links 101-102 and input/output interfaces 103-104. Input interface 103 receives input RF signal 150. RF signal 150 has desirable energy at a primary frequency, but RF signal 150 has unwanted energy at a secondary frequency.

Input interface 103 separates RF signal 150 into component RF signal 151 and component RF signal 152. Component RF signals 151-152 typically have similar energy levels. Input interface 103 transfers component RF signal 151 to conductive link 101 and transfers component RF signal 152 to conductive link 102. In some examples, input interface 103 comprises a 50-ohm coaxial cable coupled to passive RF tee.

Conductive link 101 typically comprises metal, such as a 100-ohm coaxial cable, but other conductive materials could be used, such as the air, glass, plastics, carbons, and the like—including combinations thereof. Conductive link 101 receives component RF signal 151 having desirable energy at the primary frequency and unwanted energy at the secondary frequency. Conductive link 101 has a length that corresponds to both an in-phase number (N) of wavelengths of the primary RF frequency and to an in-phase number (Y) of wavelengths of the secondary RF frequency.

For many primary and secondary frequencies, the numbers (N) and (Y) can both be one wavelength. For example, a primary frequency of 2683.5 MHz has a wavelength of 11.18 cm, and a secondary frequency of 2710 MHz has a wavelength of 11.07 cm. A conductor length between 11.07-11.18 cm can propagate approximately one wavelength at the primary frequency of 2683.5 MHz and the nearby secondary frequency of 2710 MHz. Other suitable wavelength numbers and frequencies could be used that maintain the proper phase relationships as described herein.

Conductive link 102 typically comprises metal, but other conductive materials could be used, such as the air, glass, plastics, carbons, and the like—including combinations thereof. Conductive link 101 receives component RF signal 152 having desirable energy at the primary frequency and unwanted energy at the secondary frequency. Conductive link 102 has a length that corresponds to both an in-phase number (M) of wavelengths of the primary RF frequency and to an out-of-phase number (X) of wavelengths of the secondary RF frequency. The out-of-phase number (X) is out-of-phase relative to the in-phase number (Y). For example, the in-phase number (Y) could be one wavelength and the out-of-phase number (X) could be 51.5 wavelengths, so the energy at the secondary frequency in component signals 151-152 is approximately 180 degrees out-of-phase upon arrival at output interface 104.

The in-phase number (M) and the out-of-phase number (X) of wavelengths are typically much larger than one. For example, a primary frequency of 2683.5 MHz will propagate 52 wavelengths (581.4 cm) and arrive in phase, but a secondary frequency of 2710 MHz will propagate this same distance (581.4 cm) but arrive 180 degrees out-of-phase. Thus, it takes a distance of 52 wavelengths of the primary frequency (2683.5 MHz) for the secondary frequency (2710 MHz) to shift 180 degrees out-of-phase near the time point when the primary frequency is in-phase after the 52 wavelength completes. Other suitable wavelength numbers and frequencies could be used that maintain the proper phase relationships as described herein.

The lengths of conductors 101-102 are selected so RF component signals 151-152 constructively combine with one another in-phase at the primary frequency. The lengths of conductors 101-102 are also selected so that RF component signals 151-152 destructively interfere with one another out-of-phase at the secondary frequency. Note that absolute precision on phase shift and conductor distance is not required to achieve a significant reduction in unwanted energy at the secondary frequency. Thus, the conductor distances used by filter 100 can be fine-tuned to achieve the desired level of attenuation at the secondary frequency.

Output interface 104 combines component RF signals 151-152 to form output RF signal 160. The energy of component RF signals 151-152 at the primary frequency constructively combines in-phase to contribute desirable energy to output RF signal 160 at the primary frequency. The energy of component RF signals 151-152 at the secondary frequency destructively combines out-of-phase to eliminate unwanted energy from output RF signal 160 at the secondary frequency. Output interface 104 transfers RF signal 160 to another system, such as an antenna element, device port, or the like. In some examples, output interface 104 comprises a passive RF tee coupled to a 50-ohm coaxial cable.

Figure 2:
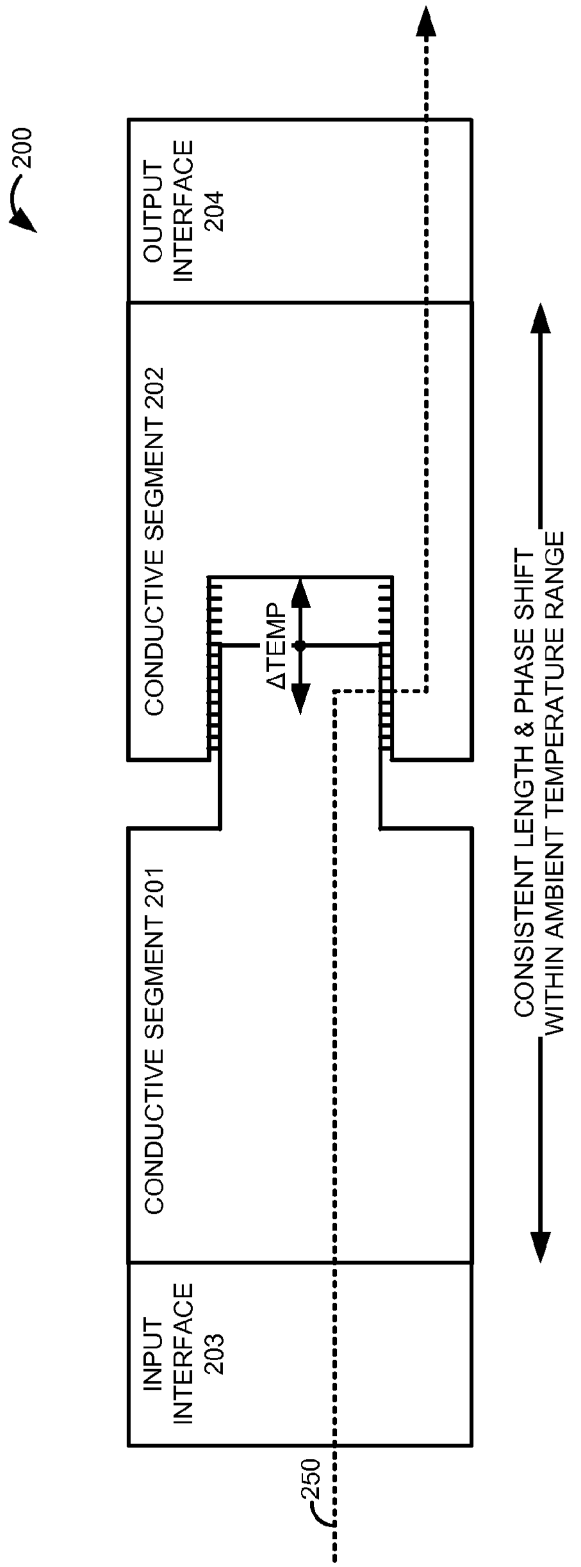
FIG. 2 illustrates a moveable conductive link for an RF filter that removes secondary energy from a primary RF signal.

FIG. 2 illustrates moveable conductive link 200 for an RF filter that removes unwanted secondary energy from a primary RF signal 250. Moveable conductive link 200 is an example of conductive links 101-102, although links 101-102 may use other configurations. Moveable conductive link 200 comprises conductive segments 201-202 and input/output interfaces 203-204. Conductive segments 201-202 and input/output interfaces 203-204 comprise metallic wiring and components, such as coaxial cabling and the like.

Together, conductive segments 201-202 form a male/female metallic fitting that provides moveable electromagnetic contact within a given ambient temperature range. The metallic fitting may use brushes, bearings, cam/shaft apparatus, and the like to provide flexible electrical contact while maintaining consistent overall length. RF signal 250 propagates through input interface 203 and conductive segment 201 to the moveable contact with conductive segment 202. RF signal 250 then propagates across the moveable contact and through conductive segment 202 to output interface 204 and beyond. Although two segments 201-202 and one moveable contact are shown, there could be additional segments and contacts that are interleaved together to form conductor 200.

Within a temperature range (such as −20 F to +120 F), conductive link 200 expands and contracts internally while maintaining a consistent end-to-end length. The consistent end-to-end length correlates to a desired number of wavelengths at a primary frequency and a desired number of wavelengths at a secondary frequency. This consistent end-to-end length generates the desired phase shifts at the primary frequency (0 degrees) and at the secondary frequency (180 degrees) to constructively and destructively combine component RF signals as described herein.

Figure 3:
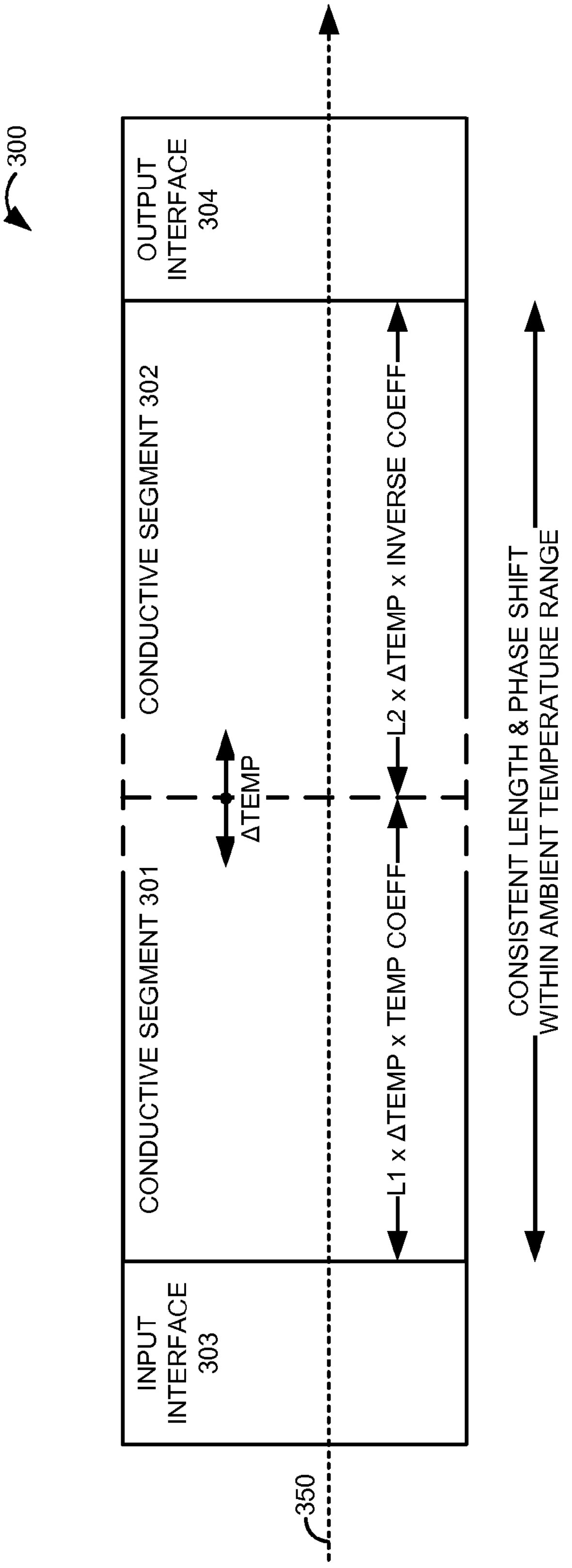
FIG. 3 illustrates a conductive link with multiple temperature coefficients for an RF filter that removes secondary energy from a primary RF signal.

FIG. 3 illustrates conductive link 300 with multiple temperature coefficients for an RF filter that removes unwanted secondary energy from primary RF signal 350. Conductive link 300 is an example of conductive links 101-102, although links 101-102 may use other configurations. Conductive link 300 comprises conductive segments 301-302 and input/output interfaces 303-304. Conductive segments 301-302 and input/output interfaces 303-304 include metallic wiring and components, such as coaxial cabling and the like.

Together, conductive segments 301-302 form an electromagnetic path that maintains consistent length within a given ambient temperature range. Conductive segment 301 expands and contracts with temperature changes according a temperature coefficient. In contrast, conductive segment 302 expands and contracts in an inverse manner with the same temperature changes according an inverse temperature coefficient. The individual lengths of conductive segments 301-302 need not be equal as long as the consistent overall length is maintained through the temperature range.

Metal may be used for conductive segment 301. Carbon-based structures may be used for conductive segment 302. Input RF signal 350 propagates through input interface 303 and conductive segment 301 to the moveable contact with conductive segment 302. Input RF signal 350 then propagates across the moveable contact and through conductive segment 302 to output interface 304 and beyond. Although two segments 301-302 and one moveable contact are shown, there could be additional segments and contacts that are interleaved together to form conductor 300.

Within a temperature range (such as −20 F to +120 F), conductive link 300 expands and contracts internally while maintaining a consistent end-to-end length. The consistent end-to-end length correlates to a desired number of wavelengths at a primary frequency and a desired number of wavelengths at a secondary frequency. This consistent end-to-end length generates the desired phase shifts at the primary frequency (0 degrees) and at the secondary frequency (180 degrees) to constructively and destructively combine component RF signals as described herein.

Figure 4:
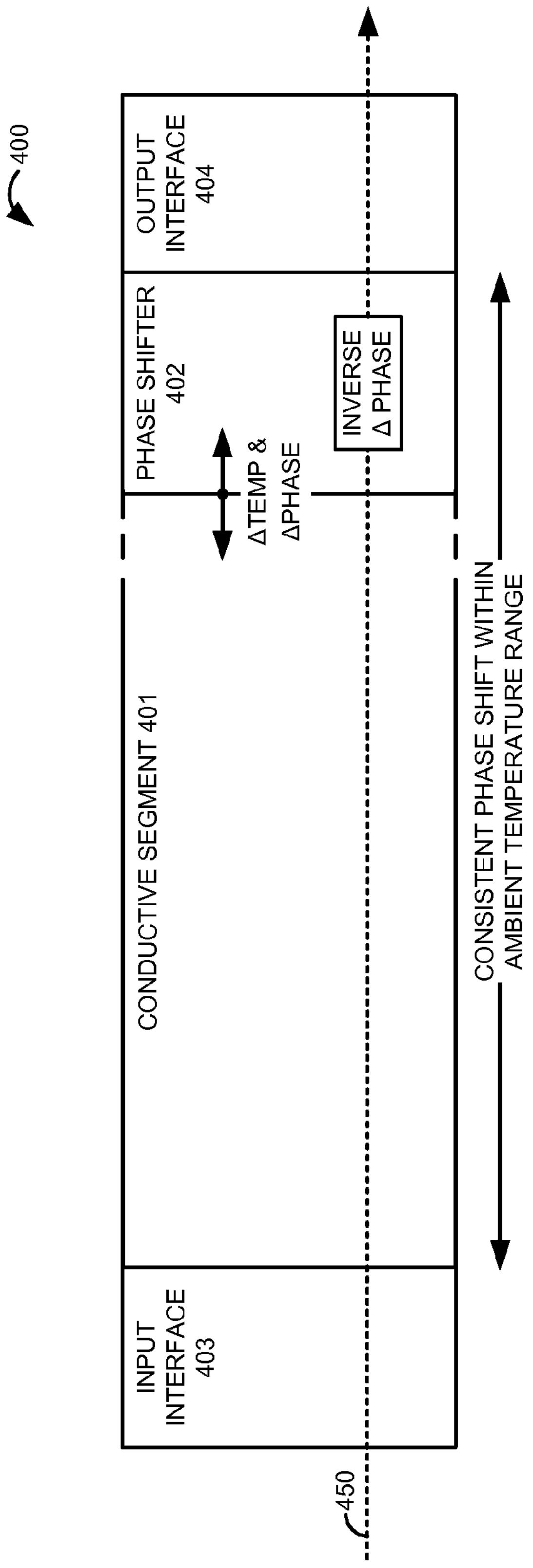
FIG. 4 illustrates a conductive link with a phase shifter for an RF filter that removes secondary energy from a primary RF signal.

FIG. 4 illustrates conductive link 400 with phase shifter 402 for an RF filter that removes unwanted secondary energy from primary RF signal 450. Conductive link 400 is an example of conductive links 101-102, although links 101-102 may use other configurations. Conductive link 400 comprises conductive segment 401, phase shifter 402, and input/output interfaces 403-404. Conductive segment 401, phase shifter 402, and interfaces 403-404 include metallic wiring and components, such as coaxial cabling and the like.

Together, conductive segment 401 and phase shifter 402 form an electromagnetic path that maintains consistent phase shift within a given ambient temperature range. Conductive segment 301 contracts with temperature reduction according a temperature coefficient. The contracted length of segment 401 produces less phase shift. To compensate, phase shifter 402 adds phase delay in an inverse manner based on the temperature/length reduction.

RF signal 450 propagates through input interface 403 and conductive segment 401 to phase shifter 402. RF signal 450 then propagates through phase shifter 402 to output interface 404 and beyond. Although one segment 401 and one phase shifter 402 are shown, there could be additional segments and phase shifters that are interleaved together to form conductor 400.

For example, phase shifter 402 can be used to maintain the in-phase number (N) of wavelengths of the primary RF frequency and the in-phase number (Y) of wavelengths of the secondary RF frequency on one conductive link. Phase shifter 402 can be also used to maintain the in-phase number (M) of wavelengths of the primary RF frequency and the out-of-phase number (X) of wavelengths of the secondary RF frequency on the other conductive link.

Within a temperature range (such as −20 F to +120 F), conductive link 400 expands and contracts while maintaining a consistent end-to-end phase shift. The consistent end-to-end phase shift correlates to a desired number of wavelengths at a primary frequency and a desired number of wavelengths at a secondary frequency. This consistent end-to-end phase shift provides the desired phase shifts at the primary frequency (0 degrees) and at the secondary frequency (180 degrees) to constructively and destructively combine component RF signals as described herein. A phase shifter may be used on conductive links 200 and 300 in combination with their movable electrical contacts.

Figure 5:
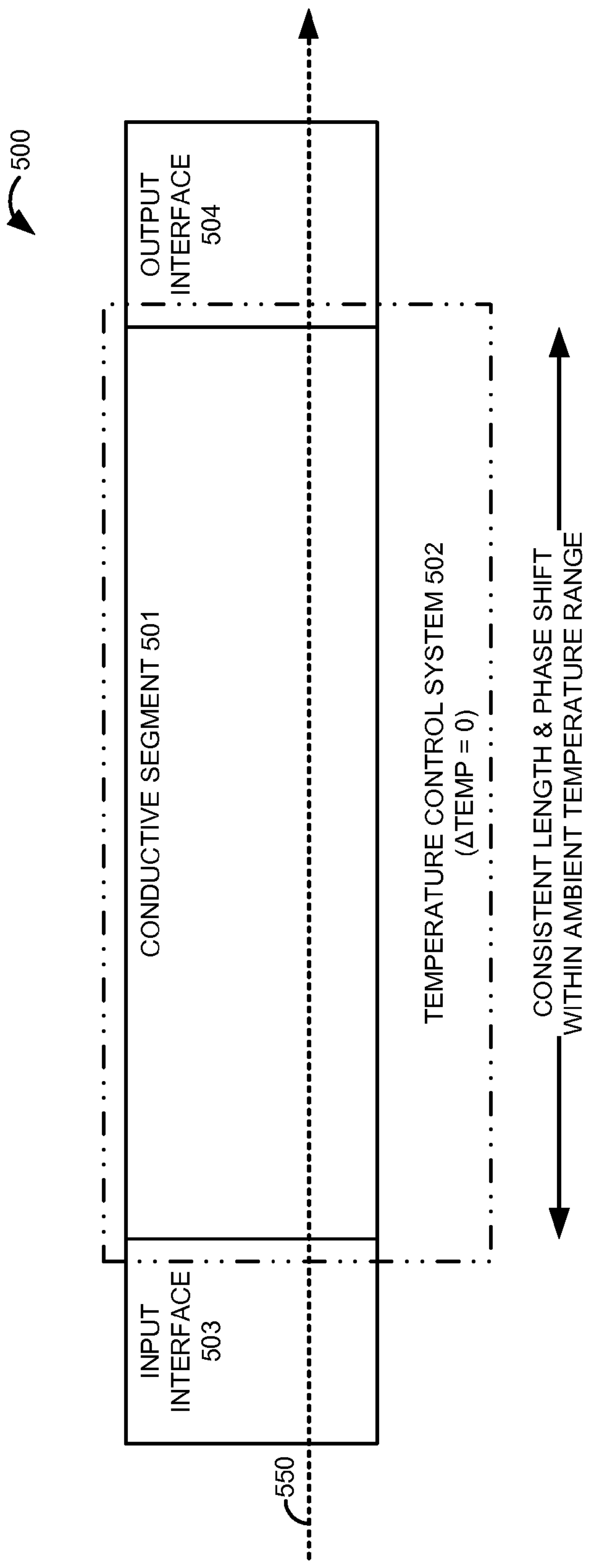
FIG. 5 illustrates a conductive link with a temperature compensation system for an RF filter that removes secondary energy from a primary RF signal.

FIG. 5 illustrates conductive link 500 with temperature compensation system 502 for an RF filter that removes unwanted secondary energy from primary RF signal 550. Conductive link 500 is an example of conductive links 101-102, although links 101-102 may use other configurations. Conductive link 500 comprises conductive segment 501, temperature compensation system 502, and input/output interfaces 503-504. Conductive segment 501, temperature compensation system 502, and interfaces 503-504 include metallic wiring and components, such as coaxial cabling and the like.

Temperature compensation system 502 maintains conductive segment 501 at a consistent temperature and length within a given ambient temperature range. Temperature compensation system 502 comprises a heated enclosure, heat tape, insulation, and the like—including combinations thereof. RF signal 550 propagates through input interface 503 and conductive segment 501 to output interface 504 and beyond. Within an ambient temperature range (such as −20 F to +120 F), conductive link 500 maintains a consistent end-to-end length and phase shift. The consistent end-to-end length and phase shift correlates to a desired number of wavelengths at a primary frequency and a desired number of wavelengths at a secondary frequency. This consistent end-to-end length and phase shift provides the desired phase shifts at the primary frequency (0 degrees) and at the secondary frequency (180 degrees) to constructively and destructively combine component RF signals as described herein.

Figure 6:
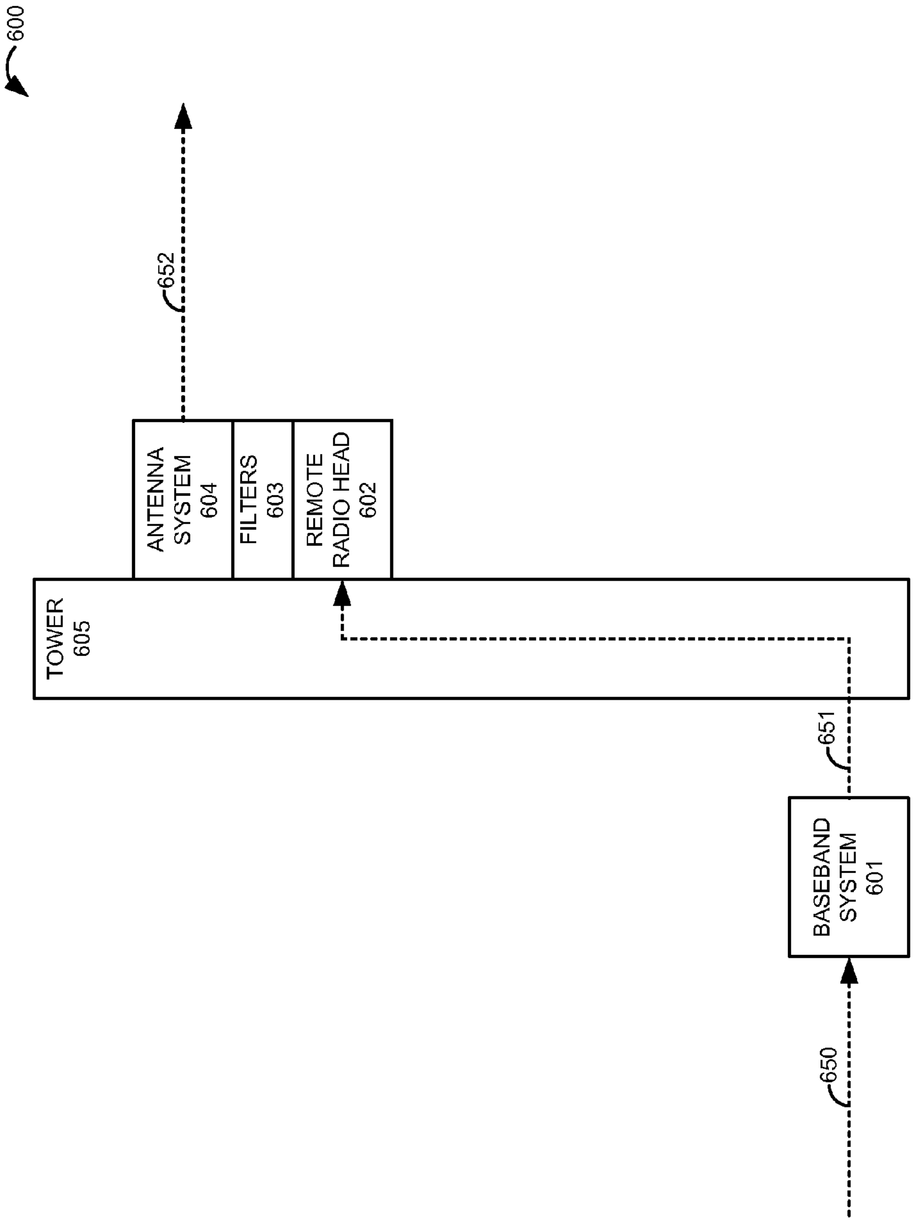
FIG. 6 illustrates an RF base station having filters to remove secondary energy from primary RF signals.

FIG. 6 illustrates RF base station 600 having filters 603 to remove secondary energy from primary RF signals. RF base station 600 comprises baseband system 601, remote radio head 602, filters 603, antenna system 604, and tower 605. Base station 600 may use wireless protocols such as Long Term Evolution (LTE), High Speed Packet Access (HSPA), Evolution Data Optimized (EVDO), Global System for Mobile Communications (GSM), Code Division Multiple Access (CDMA), Wireless Fidelity (WiFi), Worldwide Interoperability for Microwave Access (WiMAX), or some other wireless communication format.

Baseband system 601 receives data signal 650 and transfers intermediate signal 651 to remote radio head 602. Remote radio head 602 modulates, amplifies, and filters intermediate signal 651. Remote radio head 602 comprises Multiple Input Multiple Output (MIMO) and beamforming signal processors that generate multiple RF signals from intermediate signal 651.

Filters 603 process these multiple RF signals with a set of filter components that are configured and operate as described herein. The set of filter components may perform filtering operations at various different primary and secondary frequencies for the different RF signals. The filter components may be arranged in series and in parallel to form a filter component grid for the different RF signals. Filters 603 attenuate unwanted energy from the RF signals and transfer a corresponding set of filtered RF signals to antenna system 604.

Antenna system 604 comprises a set of metal antenna elements having an orthogonal arrangement and/or distance separation. Antenna system 604 receives the filtered RF signals and drives its antenna elements with the RF signals to generate corresponding RF waves 652.

Figure 7:
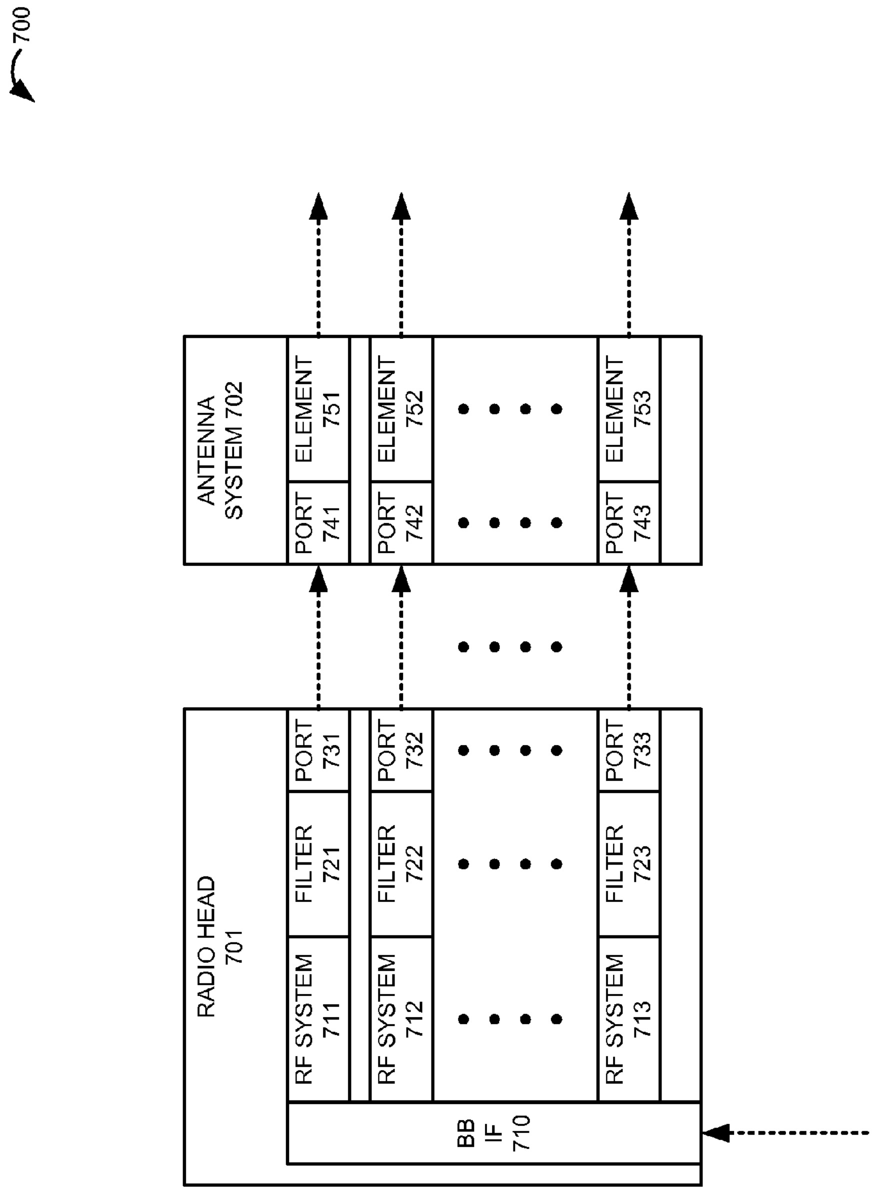
FIG. 7 illustrates a radio head having filters to remove secondary energy from primary RF signals.

FIG. 7 illustrates radio head 701 having filters 721-723 to remove unwanted energy from RF signals. Baseband (BB) interface 710 receives intermediate signals from a baseband system. BB interface 710 has MIMO and beamforming signal processors that generate multiple signal inputs for RF systems 711-713. RF systems 711-713 modulate and amplify (and typically filter) the signals from baseband interface 710. RF systems 711-713 transfer the resulting RF signals to filters 721-723.

Filters 721-723 process these RF signals with filter components that are configured and operate as described herein. These filter components may perform filtering operations at various different primary and secondary frequencies for the different RF signals. The filter components may be arranged in series and in parallel to form a filter component grid for the different RF signals. Filters 721-723 attenuate unwanted energy from the RF signals and transfer a corresponding set of filtered RF signals to radio head ports 731-733.

Radio head ports 731-733 transfer the filtered RF signals to antenna ports 741-743 in antenna system 702. Antenna ports 741-743 transfer the filtered RF signals to respective antenna elements 751-753. Antenna elements 751-753 generate RF waves based on the filtered RF signals.

Figure 8:
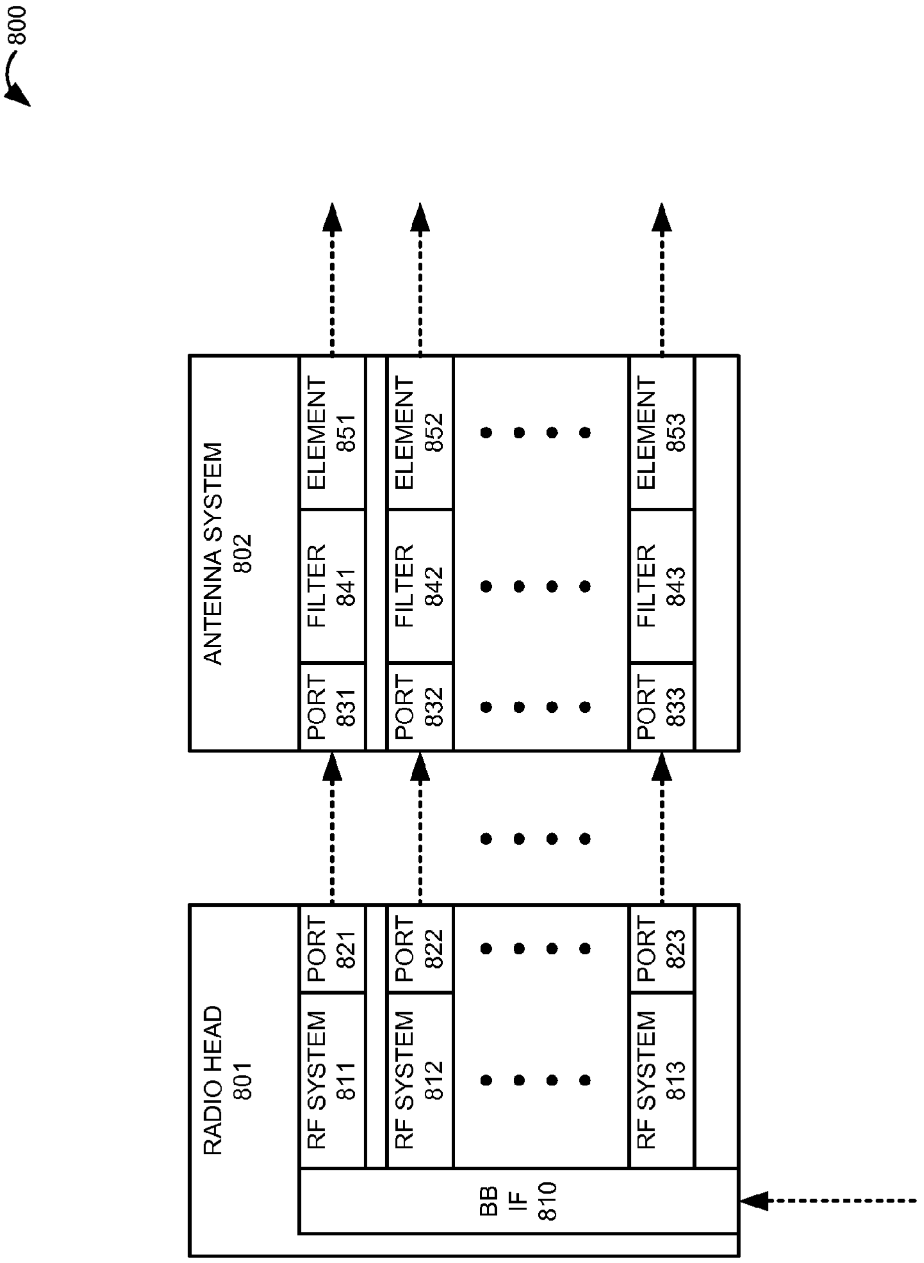
FIG. 8 illustrates an antenna system having filters to remove secondary energy from primary RF signals.

FIG. 8 illustrates antenna system 802 having filters 841-843 to remove unwanted energy from RF signals. In radio head 801, BB interface 810 receives intermediate signals from a baseband system. BB interface 810 has MIMO and beamforming signal processors that generate multiple signal inputs for RF systems 811-813. RF systems 811-813 modulate, amplify, and filter the signals from BB interface 810. RF systems 811-813 transfer the resulting RF signals to radio head ports 821-823.

Radio head ports 821-823 transfer the RF signals to antenna ports 831-833 in antenna system 802. Antenna ports 831-833 transfer the RF signals to respective filters 841-843. Filters 841-843 process these RF signals with filter components that are configured and operate as described herein. These filter components may perform filtering operations at various different primary and secondary frequencies for the different RF signals. The filter components may be arranged in series and in parallel to form a filter component grid for the different RF signals. Filters 841-843 attenuate unwanted energy from the RF signals and transfer a corresponding set of filtered RF signals to respective antenna elements 851-853. Antenna elements 851-853 generate RF waves based on the filtered RF signals.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A Radio Frequency (RF) signal filter comprising:

a first conductive link having a first length corresponding to a first (N) number of wavelengths of a primary RF frequency;

a second conductive link having a second length corresponding to both a second (M) number of wavelengths of the primary RF frequency and an out-out-phase (X) number of wavelengths of a secondary RF frequency;

an input interface configured to receive an input RF signal, transfer a first RF component of the input RF signal over the first conductive link, and transfer a second RF component of the input RF signal over the second conductive link; and an output interface configured to combine the first RF component transferred over the first conductive link with the second RF component transferred over the second conductive link to form and transfer an output RF signal.

2. The RF filter of claim 1 wherein the first conductive link comprises one or more first segments movable within one or more second segments to maintain the first length of the first conductive link within an ambient temperature range.

3. The RF filter of claim 1 wherein the second conductive link comprises one or more first segments movable within one or more second segments to maintain the second length of the second conductive link within an ambient temperature range.

4. The RF filter of claim 1 wherein the first conductive link comprises one or more first segments having a temperature coefficient and one or more second segments having an inverse coefficient to maintain the first length of the first conductive link within an ambient temperature range.

5. The RF filter of claim 1 wherein the second conductive link comprises one or more first segments having a temperature coefficient and one or more second segments having an inverse coefficient to maintain the second length of the second conductive link within an ambient temperature range.

6. The RF filter of claim 1 wherein the first conductive link comprises a phase shifter configured to maintain the in-phase number (N) of wavelengths of the primary RF frequency over the first conductive link within an ambient temperature range.

7. The RF filter of claim 1 wherein the second conductive link comprises a phase shifter configured to maintain the in-phase number (M) of wavelengths of the primary RF frequency over the second conductive link within an ambient temperature range.

8. The RF filter of claim 1 wherein the second conductive link comprises a phase shifter configured to maintain the out-of-phase number (X) of wavelengths of the secondary RF frequency over the second conductive link within an ambient temperature range.

9. The RF filter of claim 1 wherein the first conductive link comprises a temperature control system configured to maintain the first length within an ambient temperature range.

10. The RF filter of claim 1 wherein the second conductive link comprises a temperature control system configured to maintain the second length within an ambient temperature range.

11. The RF filter of claim 1 wherein the input interface is coupled to a remote radio head and the output interface is coupled to an antenna system.

12. The RF filter of claim 1 wherein the input interface is coupled to modulation systems in a radio head and the output interface is coupled to output ports in the radio head.

13. The RF filter of claim 1 wherein the input interface is coupled to antenna ports in an antenna system and the output interface is coupled to antenna elements in the antenna system.

14. The RF filter of claim 1 wherein the (N) number of wavelengths comprises 1 wavelength.

15. The RF filter of claim 1 wherein the (M) number of wavelengths comprises 52 wavelengths.

16. A Radio Frequency (RF) signal filter comprising:

a first conductive link having a first length corresponding to a first (N) number of wavelengths of a primary RF frequency;

a second conductive link having a second length corresponding to both a second (M) number of wavelengths of the primary RF frequency and an out-out-phase (X) number of wavelengths of a secondary RF frequency and comprising one or more first segments movable within one or more second segments to maintain the second length of the second conductive link within an ambient temperature range;

an input interface configured to receive an input RF signal from a remote radio head, transfer a first RF component of the input RF signal over the first conductive link, and transfer a second RF component of the input RF signal over the second conductive link; and an output interface configured to combine the first RF component transferred over the first conductive link with the second RF component transferred over the second conductive link to form and transfer an output RF signal to an antenna system.

17. The RF filter of claim 16 wherein the input interface is coupled to modulation systems in the radio head.

18. The RF filter of claim 16 wherein the output interface is coupled to output ports in the radio head.

19. The RF filter of claim 16 wherein the input interface is coupled to antenna ports in the antenna system.

20. The RF filter of claim 16 wherein the output interface is coupled to antenna elements in the antenna system.

* * * * *